United States Patent
McMillan (10) Patent No.: US 12,487,019 B2
(45) Date of Patent: Dec. 2, 2025

(54) PULL-AROUND ICE CHEST BARREL COOLER DEVICE

(71) Applicant: Brent McMillan, Los Angeles, CA (US)

(72) Inventor: Brent McMillan, Los Angeles, CA (US)

( * ) Notice: Subject to any disclaimer, the term of this patent is extended or adjusted under 35 U.S.C. 154(b) by 582 days.

(21) Appl. No.: 17/938,154

(22) Filed: Oct. 5, 2022

(65) Prior Publication Data

US 2023/0106897 A1      Apr. 6, 2023

Related U.S. Application Data

(60) Provisional application No. 63/252,815, filed on Oct. 6, 2021.

(51) Int. Cl.
*F25D 3/06* (2006.01)

(52) U.S. Cl.
CPC ...................... *F25D 3/06* (2013.01)

(58) Field of Classification Search
CPC ......... F25D 3/06; B62B 2204/06; B62B 5/06; B62B 1/18; B62B 2301/25; B62B 2301/254; B62B 2301/33; A45C 5/141
See application file for complete search history.

(56) References Cited

U.S. PATENT DOCUMENTS

| | | | | |
|---|---|---|---|---|
| 1,000,172 A * | 8/1911 | Hopkins | ............... | F25D 23/062 220/592.27 |
| 1,538,550 A * | 5/1925 | Hamilton | ............... | A01B 29/02 172/350 |
| 1,924,644 A * | 8/1933 | Himmelberger | ....... | A01B 29/02 180/19.1 |
| 2,580,084 A * | 12/1951 | Donnelly | ............... | A01B 29/02 172/350 |
| 2,843,414 A * | 7/1958 | Findiesen | ................ | B65G 7/10 294/4 |
| 3,301,358 A * | 1/1967 | Rubens | ..................... | A45C 5/00 190/22 |
| 4,160,495 A * | 7/1979 | Conard | ..................... | A45C 5/00 190/18 A |
| 4,882,914 A * | 11/1989 | Haines-Keeley | .. | B65D 81/3883 62/530 |
| 2008/0265536 A1 * | 10/2008 | Hume | ....................... | B62B 1/16 280/47.23 |
| 2009/0057083 A1 * | 3/2009 | Serrano | ................ | A45C 13/262 190/115 |

* cited by examiner

*Primary Examiner* — John Olszewski (74) *Attorney, Agent, or Firm* — Brennan, Manna & Diamond, LLC (57) ABSTRACT

The present invention relates to a novel pull-around cooler device. The device is a modified cooler or ice chest that allows users to pull the cooler over water, rocks, sand, and hiking trails without tipping over. The device comprises a round barrel-shaped housing component that features attachable rods positioned on each side of the housing with a handle in the center of the rods to assist the user in transporting and pulling the device. Further, the device can include a single bar with a handle to assist a user in pulling the device downhill. The device also comprises mini-sand-bag tire treads positioned around the outside edges of the housing component to allow a user to easily pull the device.

14 Claims, 7 Drawing Sheets

PULL-AROUND ICE CHEST BARREL COOLER DEVICE

CROSS-REFERENCE TO RELATED APPLICATION

The present application claims priority to, and the benefit of, U.S. Provisional Application No. 63/252,815, which was filed on Oct. 6, 2021, and is incorporated herein by reference in its entirety.

FIELD OF THE INVENTION

The present invention relates generally to the field of pull-around cooler devices. More specifically, the present invention relates to an improved pull-around cooler device that provides users with a barrel-shaped cooler capable of being pulled over water, rocks, sand, trails, and other terrain without tipping over. Accordingly, the present disclosure makes specific reference thereto. Nonetheless, it is to be appreciated that aspects of the present invention are also equally applicable to other like applications, devices, and methods of manufacture.

BACKGROUND

By way of background, this invention relates to improvements in pull-around coolers. Transporting a standard cooler or ice chest over rough terrain, like beach sand, gravel, etc., can be difficult and frustrating. The wheels of the cooler or ice chest may not be able to properly roll over the terrain, forcing an individual to try and carry the cooler or ice chest. Further, the cooler or ice chest may have considerable amounts of food and beverages inside, and thus be too heavy to carry. Further, emptying out the items in the cooler, just to be able to pick it up and carry it across rough terrain can also be frustrating.

Thus, it is necessary for users to have a way to transport a cooler or ice chest to any destination over any type of terrain, without carrying the cooler or ice chest. Furthermore, the cooler device needs to provide users with a handle or other similar carrying method that allows the user to pull the cooler or ice chest over rough terrain without tipping over.

Therefore, there exists a long-felt need in the art for a pull-around cooler device that provides users with a barrel-shaped cooler capable of being pulled over water, rocks, sand, hiking trails, and other terrain without tipping over. There is also a long-felt need in the art for a pull-around cooler device that features a round barrel construction with attachable rods positioned on each side to easily roll the cooler along any type of terrain. Further, there is a long-felt need in the art for a pull-around cooler device that includes a set of rods with a handle that enable users to easily pull the barrel. Moreover, there is a long-felt need in the art for a device that utilizes miniature sandbag tire treads around the cooler ends to allow a user to pull the cooler. Further, there is a long-felt need in the art for a pull-around cooler device that offers a simple method of storing and transporting items while camping, hiking, at the beach, etc. Finally, there is a long-felt need in the art for a pull-around cooler device that users can pull to any destination without spilling or tipping.

The subject matter disclosed and claimed herein, in one embodiment thereof, comprises a pull-around cooler device. The device is a modified cooler or ice chest that allows users to pull the cooler over water, rocks, sand, and hiking trails without it tipping over. The device comprises a round barrel-shaped housing component that features attachable rods positioned on each side of the housing with a handle in the center of the rods, to assist the user in transporting and pulling the device. Specifically, the rods can connect making a single handle for pulling. Further, the handle of the device can include an extension to assist a user in pulling the device. The device also comprises mini-sandbag tire treads positioned around the outside edges of the housing component to also assist a user in pulling the device.

In this manner, the pull-around cooler device of the present invention accomplishes all of the foregoing objectives and provides users with a device that can be pulled across water, rocks, dirt trails, sandy beaches, etc. The device also provides users with a cooler that can be safely pulled behind a boat or canoe. The device makes transporting a cooler from a vehicle to the destination easy and allows a user to transport a cooler without spilling the contents.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a pull-around cooler device. The device is a modified cooler or ice chest that allows users to pull the cooler over water, rocks, sand, and hiking trails without it tipping over. The device comprises a round barrel-shaped housing component that features attachable rods positioned on each side of the housing with a handle in the center of the rods to assist the user in transporting and pulling the device. Specifically, when each rod is connected, making a single handle for pulling.

In one embodiment, the pull-around cooler device comprises a round, barrel-shaped housing component. Specifically, the housing component is a cylindrical main body portion having a longitudinal axis that is horizontally oriented. Any suitable shape can be utilized for the housing component as is known in the art, such as oval, cylindrical, etc., depending on the needs and/or wants of a user, as long as the housing component can roll.

In one embodiment, the housing component comprises a hollow cavity for storing ice, beverages, and/or snacks. The housing component is manufactured of extruded aluminum, steel, molded plastic, etc., or any other suitable material as is known in the art. Further, the housing component interior is double-walled, molded Styrofoam, vacuum-insulated, etc., to create an insulated barrier to maintain the temperature of the cooler within a certain range. It uses insulation to prevent the temperature from rising above or dropping below the desired range. Insulation is also used to keep the temperature constant.

In one embodiment, the housing component comprises an inner compartment and an outer compartment. The inner compartment comprises a hollow cavity for storing ice, beverages, and/or snacks. The inner compartment is manufactured with an insulated barrier to maintain temperature within. The outer compartment works as a wheel and rotates around the inner compartment, thus allowing the inner compartment to remain stable and not turn. Typically, the inner compartment comprises a rod at each opposing end. These rods are then connected directly to a handle rod.

Further, the outer compartment has holes at each opposing end with bearings, which allow the rods to go through. This allows the outer compartment to rotate around the inner compartment.

In another embodiment, the housing component comprises an open top and/or bottom, such that a user can reach inside the hollow cavity. In one embodiment, the housing component comprises both an open top and bottom. The open top and bottom is disposed on a horizontal plane normal to the longitudinal axis of the housing component.

In another embodiment, the housing component comprises an open side panel, allowing a user to reach inside the hollow cavity through the side of the housing component.

In the embodiment with the inner and outer compartments, both compartments would have an opening. The inner compartment would have a smaller opening and the outer compartment would have a much larger opening, making it easier for the access points to line up and a user to access the inner compartment.

In one embodiment, the open top and bottom or the open side of the housing component or inner and outer compartments comprises a hinged lid to secure the hollow cavity. The hinged lid can be movably secured to the housing component via hinges, living hinges, or any other suitable securing means as is known in the art. The hinged lid moves between a closed position and an open position. The open position allows a user to access the hollow cavity and the closed position secures items within the hollow cavity. Further, the lid can also comprise a locking means to secure the lid in a closed position. The locking means comprises a latch, a buckle, snap, etc., or any other suitable locking means as is known in the art. Thus, the locking means provides for the secure attachment of the lid to the housing component thereby creating an aesthetically pleasing cooler device while at the same time, facilitating easy transport of the cooler device.

In one embodiment, the housing component comprises a pair of mini-sandbag tire treads, one positioned on each side of the housing component to help in rotating the device when pulled. The mini-sandbag tire treads can be any suitable rotating slip ring component as is known in the art, depending on the needs and/or wants of a user, as long as the component allows the device to freely rotate without binding the handle or pull strings.

In one embodiment, the device comprises a rod secured to both ends of the housing component. The rod can be secured to the axis of the mini-sandbag tire treads or to the ends of the housing component itself. Typically, the rods would be secured via welding, bolting, screwing, etc., or any other suitable securing means as is known in the art.

In one embodiment, the end of each rod comprises a handle component as is known in the art. The rod can comprise any suitable handle, textured component, gripping accessory, etc., or any other suitable means for helping a user retain a rod in their hand, as is known in the art. In another embodiment, the handle components of the rod can be secured together making a single, large handle component for ease in pulling the device. The rods can be secured together via a twist lock, screws, bolts, clips, etc., or any other suitable securing means as is known in the art.

In another embodiment, the device comprises an extension. The rods are connected to a handle and the middle of the handle can be extended using two rods connected to a handle grip. If the extension rods are slid together, a handle grip is formed. If the extension rods are slid apart, they can be locked with the original rods to form one handle.

In yet another embodiment, the pull-around cooler device comprises a plurality of indicia.

In yet another embodiment, a method of pulling a cooler over rough terrain is described. The method includes the steps of providing a pull-around cooler device comprising a round barrel-shaped housing component with mini-sandbag tire treads and attachable rods positioned on each side of the housing with a handle in the center of the rods to pull the device. The method also comprises opening the lid and filling the housing component with beverages, ice, and/or snacks. Further, the method comprises securing the lid once filled with snacks and/or beverages. Finally, pulling the handle which rotates the mini-sandbag tire treads and pulls the cooler device, allowing the device to be easily pulled through rough terrain.

This invention, in addition to its benefits while camping, hiking, canoeing, kayaking, etc., is also ideally suited for use at sporting events, outings, picnics, beaches, etc., and other suitable activities as is known in the art.

Numerous benefits and advantages of this invention will become apparent to those skilled in the art to which it pertains, upon reading and understanding the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long-felt need in the art for a pull-around cooler device that provides users with a barrel-shaped cooler capable of being pulled over water, rocks, sand, hiking trails, and other terrain without tipping over. There is also a long-felt need in the art for a pull-around cooler device that features a round barrel construction with attachable rods positioned on each side to easily roll the cooler along any type of terrain. Further, there is a long-felt need in the art for a pull-around cooler device that includes a set of rods with a handle that enable users to easily pull the barrel. Moreover, there is a long-felt need in the art for a device that utilizes miniature sandbag tire treads around the cooler ends to allow a user to pull the cooler. Further, there is a long-felt need in the art for a pull-around cooler device that offers a simple method of storing and transporting items while camping, hiking, at the beach, etc. Finally, there is a long-felt need in the art for a pull-around cooler device that users can pull to any destination without spilling or tipping.

The present invention, in one exemplary embodiment, is a novel pull-around cooler device. The device is a modified cooler or ice chest that allows users to pull the cooler over water, rocks, sand, and hiking trails without it tipping over. The device comprises a round barrel-shaped housing component that features attachable rods positioned on each side of the housing with a handle in the center of the rods to assist the user in transporting and pulling the device. Further, the device can include an extension handle to assist a user in pulling the device downhill. The device also comprises mini-sandbag tire treads positioned around the outside edges of the housing component to also assist a user in pulling the device. The present invention also includes a novel method of pulling a cooler over rough terrain. The method includes the steps of providing a pull-around cooler device comprising a round barrel-shaped housing component with mini-sandbag tire treads and attachable rods positioned on each side of the housing with a handle in the center of the rods to pull the device. The method also comprises opening the lid and filling the housing component with beverages, ice, and/or snacks. Further, the method comprises securing the lid once filled with snacks and/or beverages. Finally, pulling the handle which rotates the mini-sandbag tire treads and pulls the cooler device, allowing the device to be easily pulled through rough terrain.

Figure 1A:
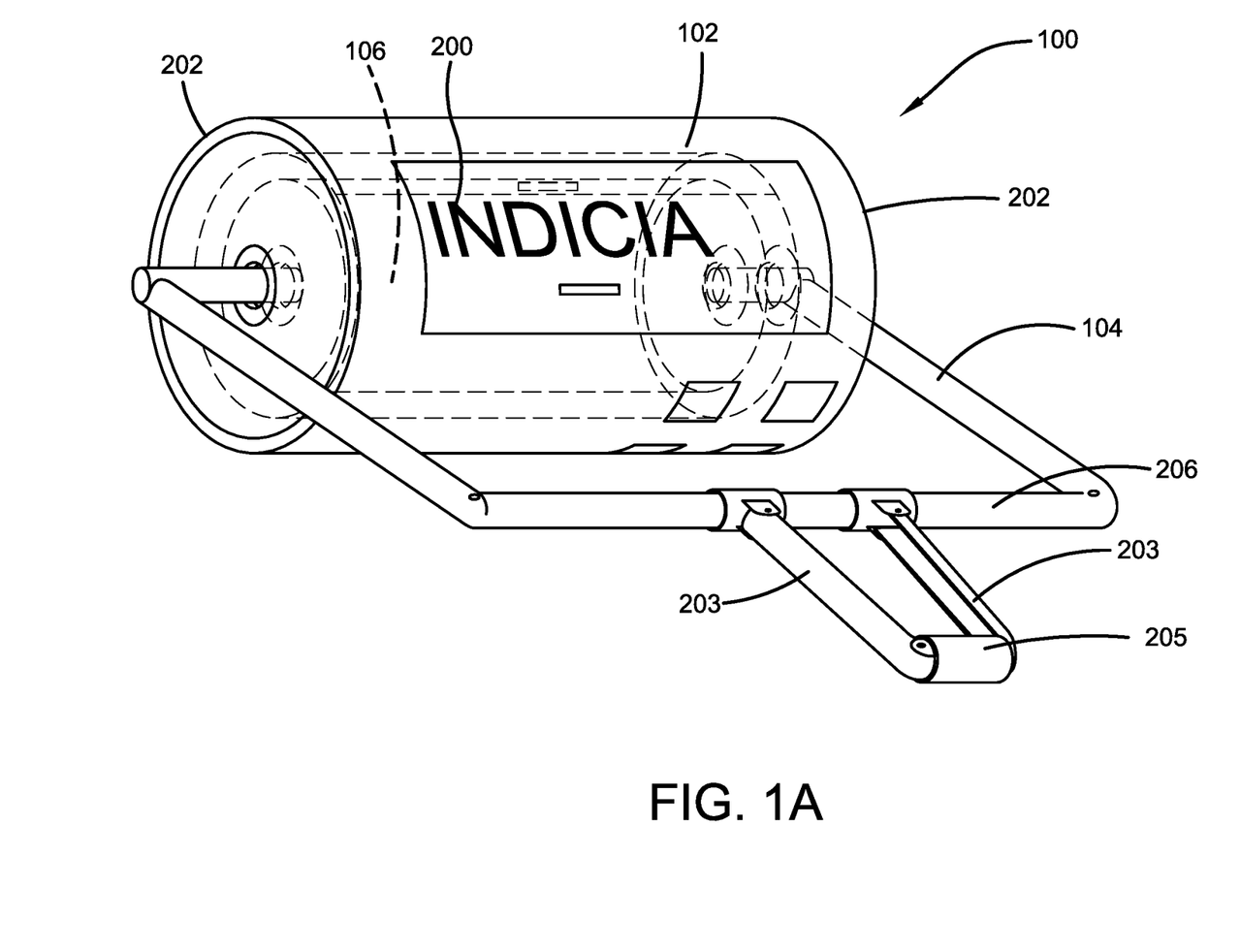
FIG. 1A illustrates a perspective view of one embodiment of the pull-around cooler device of the present invention in accordance with the disclosed architecture.

Referring initially to the drawings, FIG. 1A illustrates a perspective view of one embodiment of the pull-around cooler device 100 of the present invention. In the present embodiment, the pull-around cooler device 100 is an improved pull-around cooler device that provides users with a barrel-shaped cooler or ice chest capable of being pulled over rough terrain without tipping. The pull-around cooler device 100 further comprises a round barrel-shaped housing component 102 that features attachable rods 104 positioned on each side of the housing component 102 to assist the user in transporting and pulling the device 100. Specifically, the housing component 102 is a cylindrical main body portion having a longitudinal axis that is horizontally oriented. However, any suitable shape can be utilized for the housing component 102 as is known in the art, such as oval, cylindrical, etc., depending on the needs and/or wants of a user, as long as the housing component 102 can roll.

Additionally, the housing component 102 comprises a hollow cavity 106 for storing ice, beverages, and/or snacks, or any other suitable items that are typically placed in a cooler/ice chest. The housing component 102 is typically manufactured of extruded aluminum, steel, other lightweight metals, or molded plastic or polymers, such as polypropylene or acrylonitrile-butadiene-styrene (ABS), or any other suitable material as is known in the art, such as but not limited to, polyethylene, thermoplastics, polyethylene terephthalate, polyvinyl chloride, polystyrene, etc. Generally, the pull-around cooler device 100 is also manufactured from a material that is water resistant or waterproof, or the housing component 102 comprises a coating that is water resistant or waterproof. Further, the housing component 102 interior is double-walled, molded Styrofoam, vacuum-insulated, etc., to create an insulated barrier to maintain the temperature of the cooler device 100 within a certain range. Thus, it uses insulation to prevent the temperature from rising above or dropping below the desired range. Insulation is also used to keep the temperature constant.

Figures 1B, 1C:
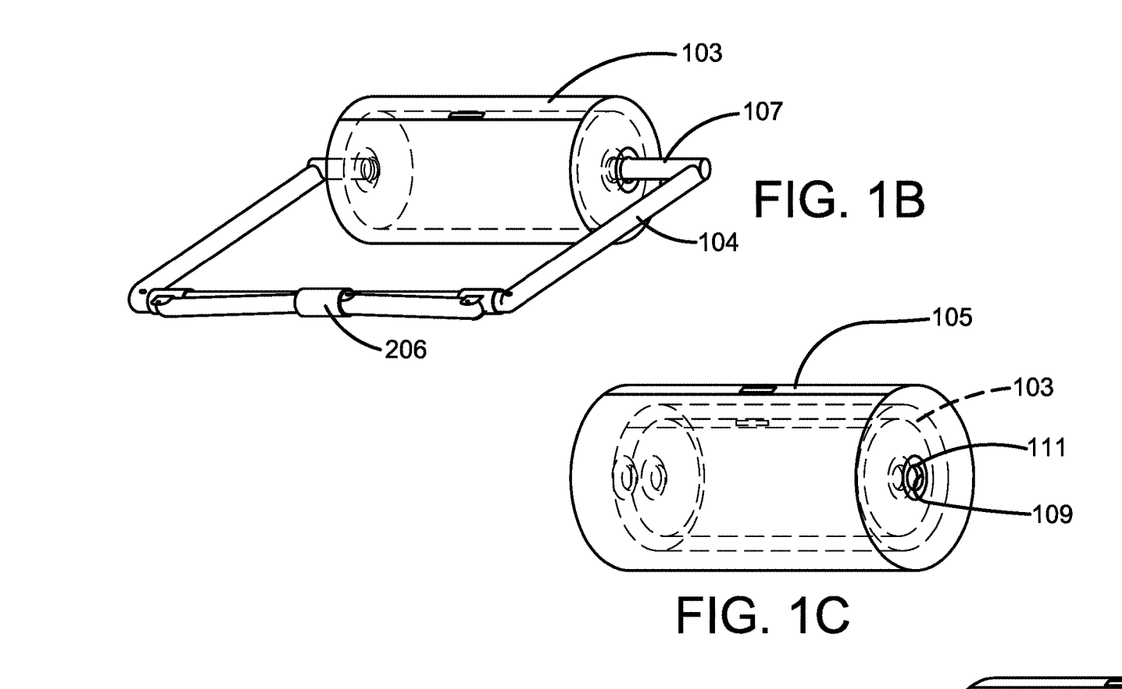
FIGS. 1B-D illustrate a perspective view of one embodiment of the pull-around cooler device of the present invention disclosing an inner and outer compartment in accordance with the disclosed architecture.
Figure 1D:
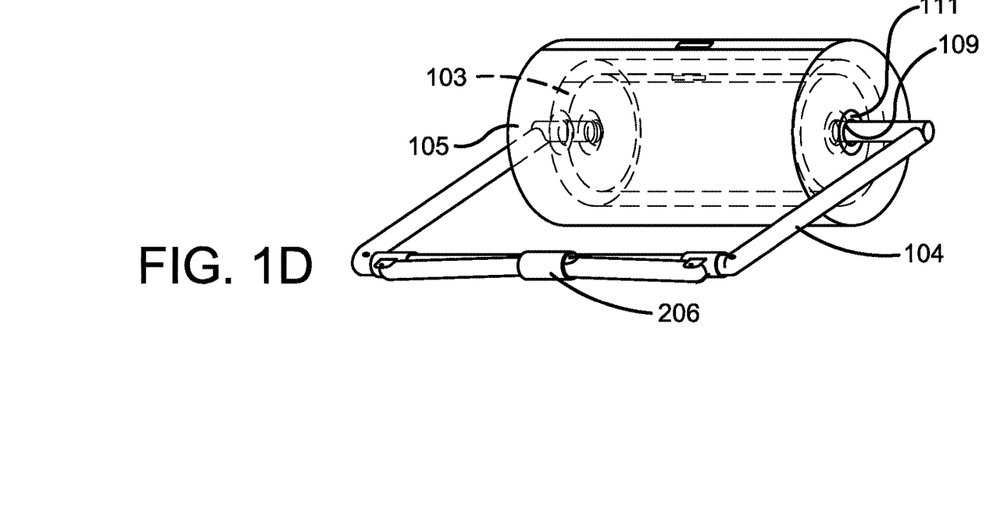

As shown in FIGS. 1B-D, the housing component 102 comprises an inner compartment 103 and an outer compartment 105. The inner compartment 103 comprises a hollow cavity for storing ice, beverages, and/or snacks. The inner compartment 103 is manufactured with an insulated barrier to maintain temperature within. The outer compartment 105 works as a wheel and rotates around the inner compartment 103, thus allowing the inner compartment 103 to remain stable and not turn with the outer compartment 105. Typically, the inner compartment 103 comprises a rod 107 at each opposing end. These rods 107 are then connected directly to a handle rod 104. Further, the outer compartment 105 has holes 109 at each opposing end with bearings 111, which allow the rods 107 to go through. This allows the outer compartment 105 to rotate around the inner compartment 103.

Figure 2A:
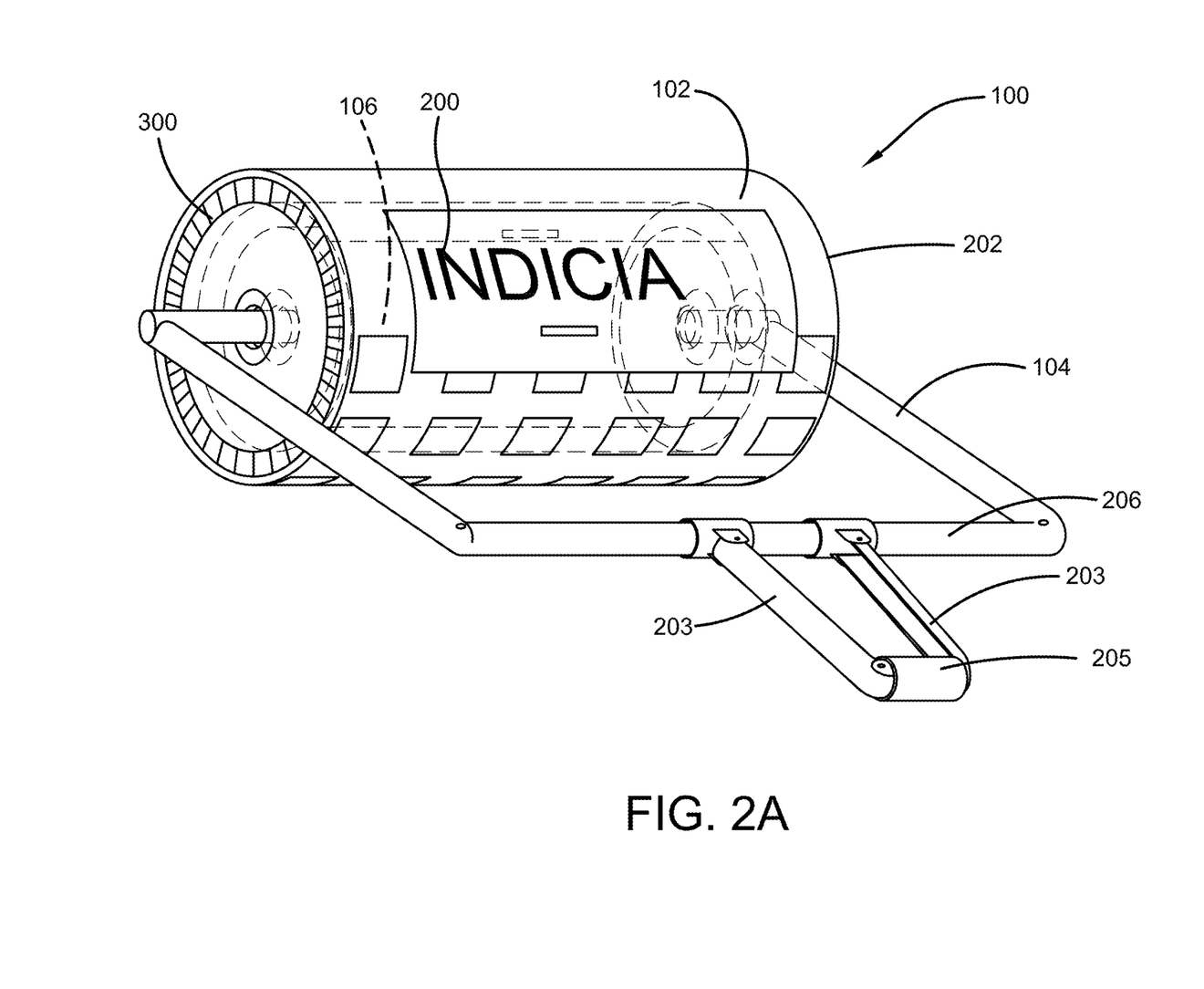
FIG. 2A illustrates a perspective view of one embodiment of the pull-around cooler device of the present invention wherein the housing component comprises a plurality of indicia in accordance with the disclosed architecture.

As shown in FIG. 2A, the pull-around cooler device 100 comprises a plurality of indicia 200. The housing component 102 of the device 100 may include advertising, a trademark, or other letters, designs, or characters, printed, painted, stamped, or integrated into the housing component 102, or any other indicia 200 as is known in the art. Specifically, any suitable indicia 200 as is known in the art can be included, such as, but not limited to, patterns, logos, emblems, images, symbols, designs, letters, words, characters, animals, advertisements, brands, etc., that may or may not be cooler/brand related.

Further, the device 100 comprises a handle rod 104 secured to both ends 202 of the housing component 102. Typically, the rod 104 would be secured to the housing component 102 ends 202 via welding, screwing, bolting, etc., or any other suitable securing means as is known in the art. The rod 104 can be manufactured of any suitable lightweight metal material as is known in the art.

Figures 2B, 2C, 2D:
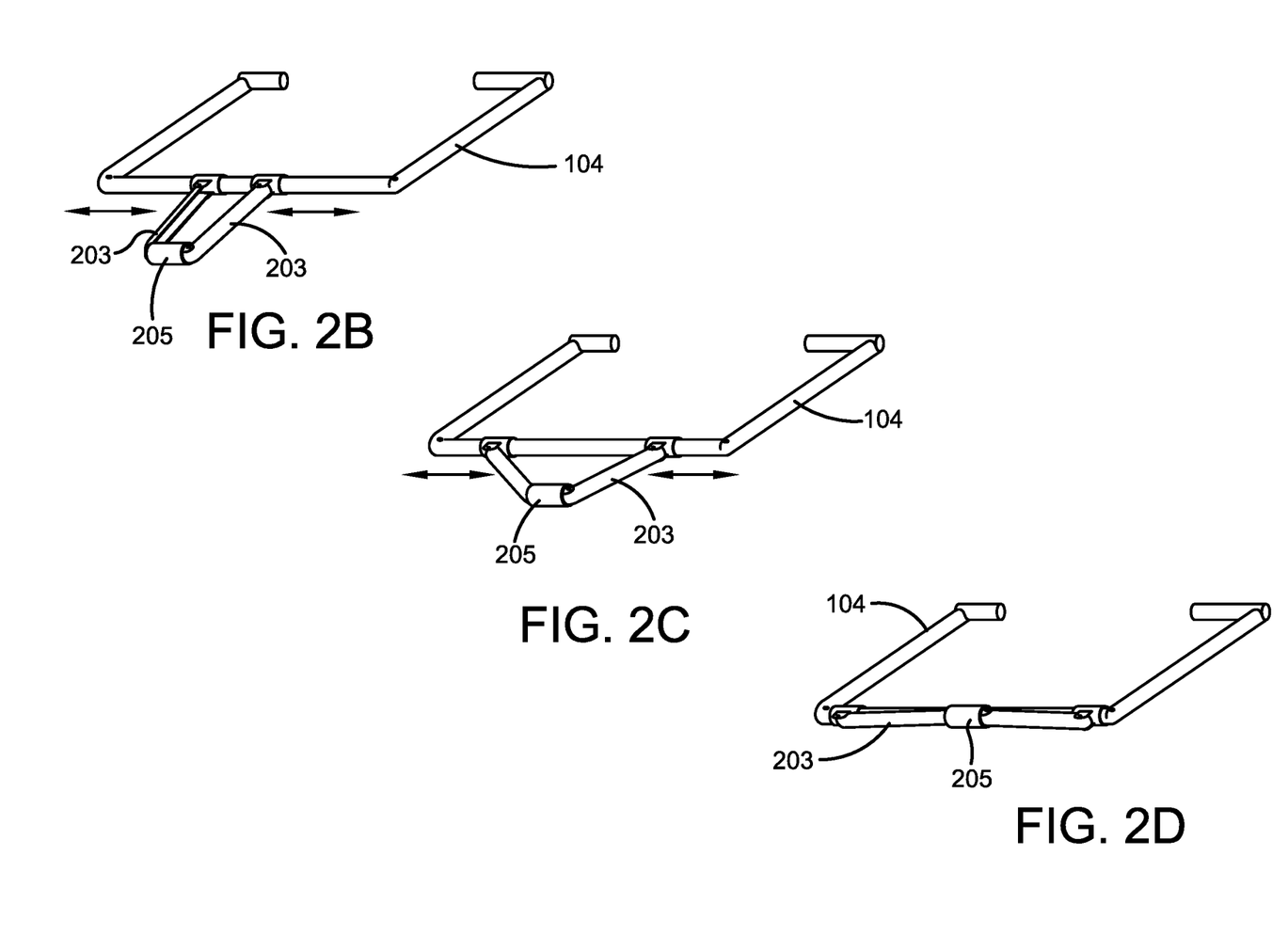
FIGS. 2B-D illustrate a perspective view of one embodiment of the pull-around cooler device of the present invention disclosing the handle extension in accordance with the disclosed architecture.

As shown in FIGS. 2B-D, the end 204 of each rod 104 comprises a handle component 206 as is known in the art. The rod 104 can comprise any suitable handle, textured component, gripping accessory, etc., or any other suitable means for helping a user retain a rod 104 in their hand, as is known in the art. In another embodiment, the handle components 206 of the rod 104 can comprise two extension rods 203 connected to a hand grip 205 for ease in pulling the device 100. If the extension rods 203 are slid together, a handle grip 205 is formed. If the extension rods 203 are slid apart, they can be locked with the original rods 104 to form one handle.

Figure 3:
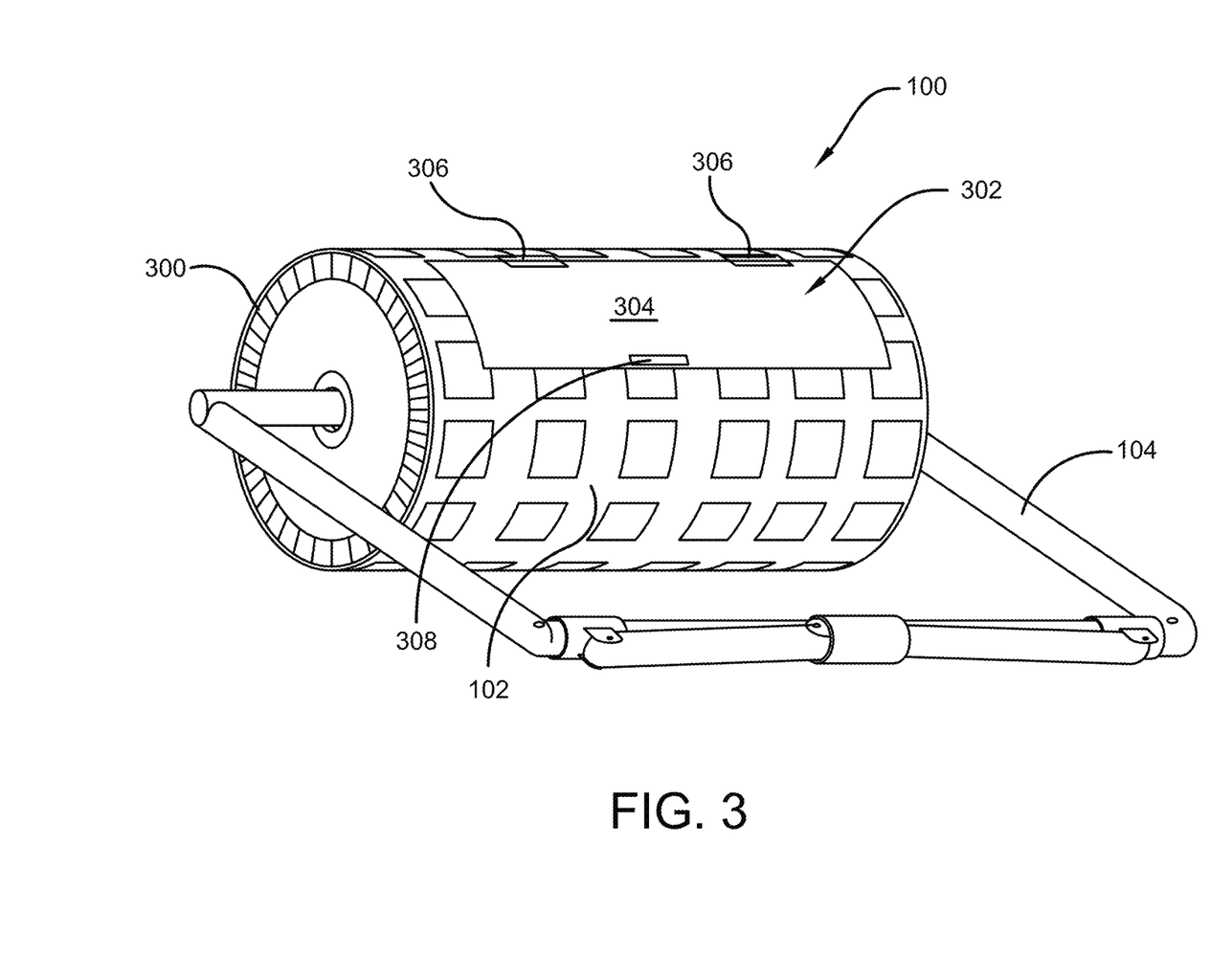
FIG. 3 illustrates a perspective view of one embodiment of the pull-around cooler device of the present invention disclosing the attachable rods and handle in accordance with the disclosed architecture.

As shown in FIG. 3, the housing component 102 comprises a pair of mini-sandbag tire treads 300, one positioned on each side (or end 202) of the housing component 102 to help in rotating the device 100 when pulled. The mini-sandbag tire treads 300 can be any suitable rotating slip ring component as is known in the art, depending on the needs and/or wants of a user, as long as the component allows the device 100 to freely rotate without binding the handle component 206 or rods 104.

Furthermore, in one embodiment, the rods 104 of the device 100 can be secured to the axis of the mini-sandbag tire treads 300 or to the ends 202 of the housing component 102 itself. Typically, the rods 104 would be secured via welding, screwing, bolting, etc., or any other suitable securing means as is known in the art. This allows a user to pull the cooler device 100 with ease.

In another embodiment, the housing component 102, the inner compartment 103, and the outer compartment 105 comprise an open side panel 302, allowing a user to reach inside the hollow cavity 106 through the side of the housing component 102. The open side panel 302 comprises a hinged lid 304 to secure the hollow cavity 106. The hinged lid 304 can be movably secured to the housing component 102 via hinges 306, living hinges, or any other suitable securing means as is known in the art. The hinged lid 304 moves between a closed position and an open position. The open position allows a user to access the hollow cavity 106 and the closed position secures items within the hollow cavity 106. Further, the lid 304 can also comprise a locking means 308 to secure the lid 304 in a closed position. The locking means 308 comprises a latch, a buckle, snap, etc., or any other suitable locking means 308 as is known in the art. Thus, the locking means 308 provides for the secure attachment of the lid 304 to the housing component 102 thereby creating an aesthetically pleasing cooler device 100 while at the same time, facilitating easy transport of the cooler device 100. Further, in the embodiment with the inner 103 and outer 105 compartments, both compartments would have an opening 302 (open side panel). The inner compartment 103 would have a smaller opening and the outer compartment 105 would have a much larger opening, making it easier for the access points to line up and a user to access the inner compartment 103.

Figures 4A, 4B:
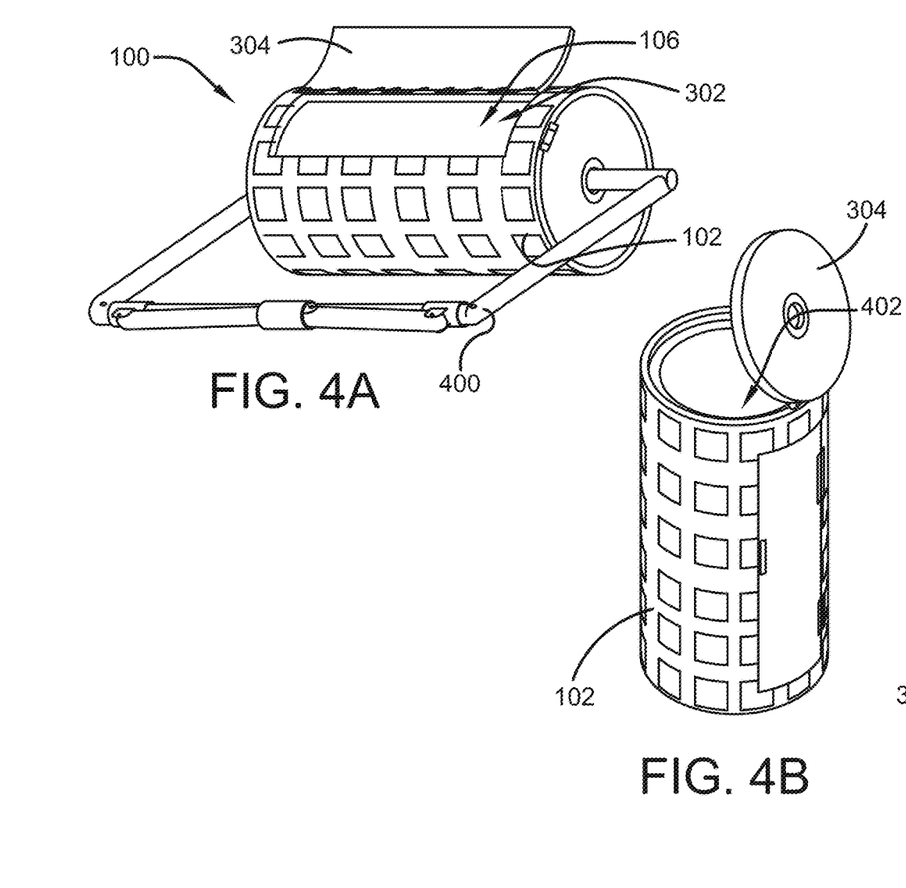
FIGS. 4A-C illustrate a perspective view of one embodiment of the pull-around cooler device of the present invention disclosing the hinged lid in accordance with the disclosed architecture.
Figure 4C:
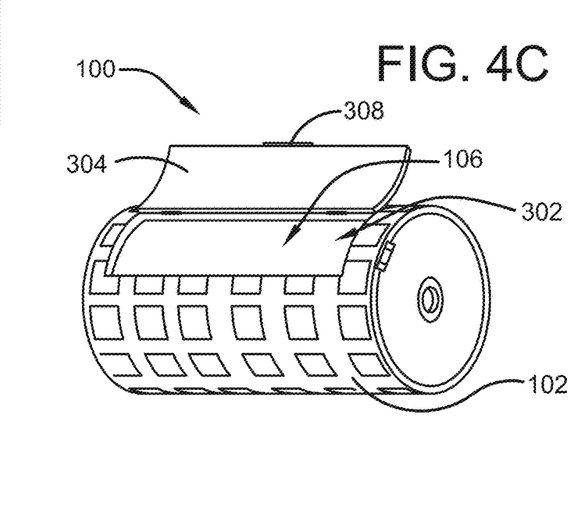

As shown in FIGS. 4A-C, in one embodiment, the device 100 comprises a single, rigid bar component 400 secured to both ends 202 of the housing component 102. The rigid bar component 400 allows the device 100 to be pulled downhill with ease. The rigid bar 400 can be secured to the axis of the mini-sandbag tire treads 300 or to the ends 202 of the housing component 102 itself. Typically, the rigid bar 400 would be secured via a spring-plunger, threaded, twist-lock, etc., or any other suitable securing means as is known in the art. Further, the single, rigid bar 400 can also comprise a handle component 206 to aid a user in pulling the device 100.

In another embodiment, the housing component 102 comprises an open top and/or bottom 402, such that a user can reach inside the hollow cavity 106. In one embodiment, the housing component 102 comprises both an open top and bottom 402. The open top and bottom 402 are disposed on a horizontal plane normal to the longitudinal axis of the housing component 102. Further, the housing component 102 comprises an open side panel 302, allowing a user to reach inside the hollow cavity 106 through the side of the housing component 102 to place or remove items from the cooler device 100.

Furthermore, the open top and bottom 402 or the open side 302 of the housing component 102 comprises a hinged lid 304 to secure the hollow cavity 106. The hinged lid 304 can be movably secured to the housing component 102 via hinges 306, living hinges, or any other suitable securing means as is known in the art. The hinged lid 304 moves between a closed position and an open position. The open position allows a user to access the hollow cavity 106 and the closed position secures items within the hollow cavity 106. Further, the lid 304 can also comprise a locking means 308 to secure the lid 304 in a closed position. The locking means 308 comprises a latch, a buckle, snap, etc., or any other suitable locking means as is known in the art. Thus, the locking means 308 provides for the secure attachment of the lid 304 to the housing component 102 thereby creating an aesthetically pleasing cooler device 100 while at the same time facilitating easy transport of the cooler device 100.

Figure 5:
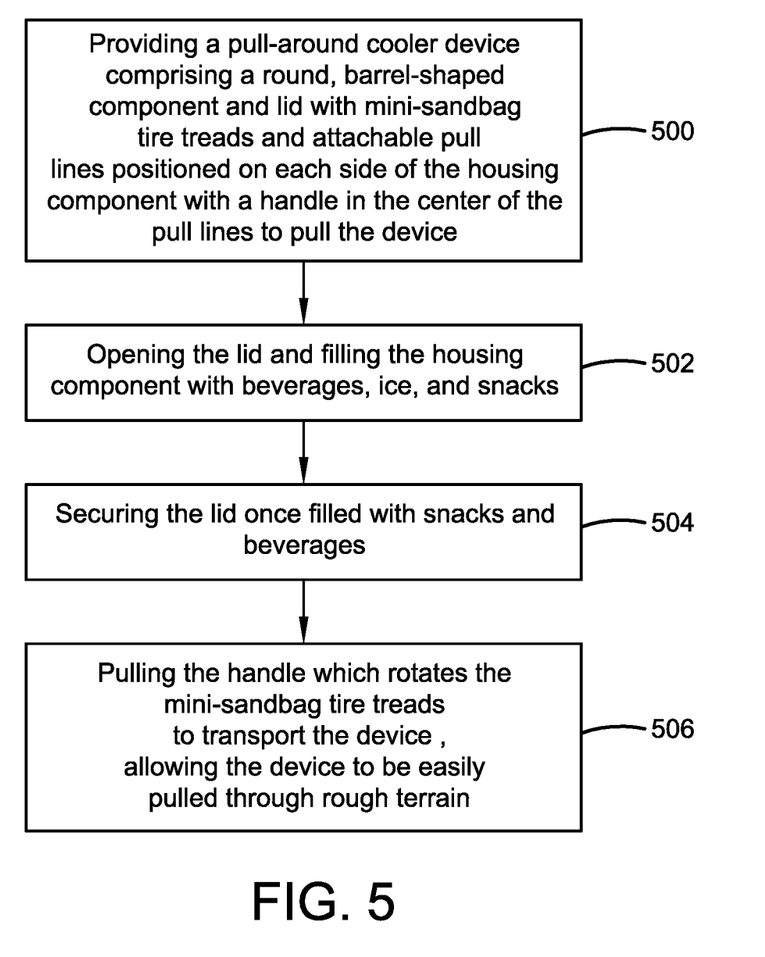
FIG. 5 illustrates a flowchart showing the method of pulling a cooler over rough terrain in accordance with the disclosed architecture.

FIG. 5 illustrates a flowchart of the method of pulling a cooler over rough terrain. The method includes the steps of at 500, providing a pull-around cooler device comprising a round barrel-shaped housing component with mini-sandbag tire treads and attachable rods positioned on each side of the housing with a handle in the center of the lines to pull the device. The method also comprises at 502, opening the lid and filling the housing component with beverages, ice, and/or snacks. Further, the method comprises at 504, securing the lid once filled with snacks and/or beverages. Finally, at 506, pulling the handle which rotates the mini-sandbag tire treads and pulls the cooler device, allowing the device to be easily pulled through rough terrain.

This invention, in addition to its benefits while camping, hiking, canoeing, kayaking, etc., is also ideally suited for use at sporting events, outings, picnics, beaches, etc., and other suitable activities as is known in the art.

Certain terms are used throughout the following description and claims to refer to particular features or components. As one skilled in the art will appreciate, different users may refer to the same feature or component by different names. This document does not intend to distinguish between components or features that differ in name but not structure or function. As used herein "pull-around cooler device", "cooler device", and "device" are interchangeable and refer to the pull-around cooler device 100 of the present invention.

Notwithstanding the foregoing, the pull-around cooler device 100 of the present invention can be of any suitable size and configuration as is known in the art without affecting the overall concept of the invention, provided that it accomplishes the above-stated objectives. One of ordinary skill in the art will appreciate that the pull-around cooler device 100 as shown in FIGS. 1-5 are for illustrative purposes only, and that many other sizes and shapes of the pull-around cooler device 100 are well within the scope of the present disclosure. Although the dimensions of the pull-around cooler device 100 are important design parameters for user convenience, the pull-around cooler device 100 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A pull-around cooler device that can be pulled over rough terrain without tipping, the pull-around cooler device comprising:
    a housing component that is barrel-shaped and comprises an interior that is a double-walled insulated barrier that maintains a temperature of the housing component within a certain temperature range; and
    at least one rod secured to each end of the housing component;
    wherein the at least one rod assists a user in transporting and pulling the housing component;
    wherein the housing component further comprises a longitudinal axis that is horizontally oriented and a hollow cavity for storing items;
    wherein the housing component comprises an outer compartment that rotates around an inner compartment;
    wherein the outer compartment comprises a large opening and the inner compartment comprises a smaller opening, so that a user can easily access the inner compartment through the outer compartment;
    wherein the at least one rod comprises a handle component;
    wherein each of the handle components of the two rods is secured together to form a large handle component for ease in pulling the housing component; and
    further wherein the housing component further comprises a pair of mini-sandbag tire treads, with one mini-sandbag tire tread secured to each end of the housing component.

2. The pull-around cooler device of claim 1, wherein the at least one rod is secured to each of the pair of mini-sandbag tire treads.

3. The pull-around cooler device of claim 2, wherein the at least one rod is secured to an axis of each of the pair of mini-sandbag tire treads.

4. The pull-around cooler device of claim 3, wherein the housing component further comprises an open side panel that allows a user access to the hollow cavity.

5. The pull-around cooler device of claim 4, wherein the open side panel comprises a hinged lid.

6. The pull-around cooler device of claim 5, wherein the hinged lid comprises a locking means to secure the hollow cavity.

7. The pull-around cooler device of claim 6, wherein the housing component further comprises a single, rigid bar component secured to the pair of mini-sandbag tire treads.

8. A pull-around cooler device that can be pulled over rough terrain without tipping, the pull-around cooler device comprising:
    a housing component that is barrel-shaped and comprises an outer compartment that rotates around an inner compartment;
    a pair of mini-sandbag tire treads, with one mini-sandbag tire tread secured to each end of the outer compartment; and
    at least one rod and handle secured to each of the pair of mini-sandbag tire treads;
    wherein the at least one rod assists a user in transporting and pulling the housing component;
    wherein the inner compartment comprises a hollow cavity for storing items; and
    further wherein the inner compartment comprises an interior that is a double-walled insulated barrier which maintains temperature of the inner compartment within a certain temperature range.

9. The pull-around cooler device of claim 8, wherein the housing component comprises an open top or bottom end which allows a user access to the hollow cavity.

10. The pull-around cooler device of claim 9 wherein the open top or bottom end comprises a hinged lid with a locking means to secure the hollow cavity.

11. The pull-around cooler device of claim 8 wherein the housing component comprises an open top and open bottom end which allows a user access to the hollow cavity.

12. The pull-around cooler device of claim 11 wherein the open top and open bottom end both comprise a hinged lid with a locking means to secure the hollow cavity.

13. The pull-around cooler device of claim 8 wherein the housing component comprises a single, rigid bar component secured to the pair of mini-sandbag tire treads.

14. A method of pulling a cooler over rough terrain, the method comprising the steps of:
    providing a pull-around cooler device comprising a round, barrel-shaped housing component and lid with mini-sandbag tire treads and attachable rods positioned on each side of the housing component with a handle in the center of the rods to pull the pull-around cooler device;
    opening the lid and filling the housing component with beverages, ice, and snacks; securing the lid once filled with snacks and beverages; and
    pulling the handle which rotates the mini-sandbag tire treads to transport the pull-around cooler device, allowing the device to be easily pulled through rough terrain.

* * * * *